United States Patent [19]
Rybinski

[11] Patent Number: 5,690,363
[45] Date of Patent: Nov. 25, 1997

[54] ENERGY ABSORBING MOUNTING BRACKET

[75] Inventor: Witold Peter Rybinski, Saginaw, Mich.

[73] Assignee: General Motors Corporation, Detroit, Mich.

[21] Appl. No.: 570,060

[22] Filed: Dec. 11, 1995

[51] Int. Cl.[6] .................. B62D 1/16; B62D 1/19
[52] U.S. Cl. .................. 280/779; 280/777; 74/492
[58] Field of Search .................. 280/775, 777, 280/779; 74/492, 493

[56] References Cited

U.S. PATENT DOCUMENTS

| | | | |
|---|---|---|---|
| 1,461,210 | 7/1923 | Corley | 280/779 |
| 1,498,567 | 6/1924 | Onderdonk | 280/779 |
| 3,502,346 | 3/1970 | Cadiou | 280/779 |
| 3,948,539 | 4/1976 | Murase et al. | 280/87 R |
| 4,452,096 | 6/1984 | Workman | 74/492 |
| 4,703,669 | 11/1987 | Hyodo | 280/779 |
| 4,733,575 | 3/1988 | Nakamura | 74/493 |
| 4,951,522 | 8/1990 | Chowdhury et al. | 74/492 |
| 5,052,715 | 10/1991 | Ervin et al. | 280/775 |
| 5,081,879 | 1/1992 | Pidgeon | 74/492 |
| 5,082,311 | 1/1992 | Melotik | 280/777 |
| 5,088,768 | 2/1992 | Maruyama et al. | 280/777 |
| 5,230,533 | 7/1993 | Yamaguchi | 280/775 |
| 5,294,149 | 3/1994 | Haldric et al. | 280/779 |
| 5,356,179 | 10/1994 | Hildebrandt et al. | 280/777 |
| 5,380,040 | 1/1995 | Perichon et al. | 280/777 |
| 5,417,452 | 5/1995 | Khalifa et al. | 280/777 |

*Primary Examiner*—Paul N. Dickson
*Attorney, Agent, or Firm*—Saul Schwartz

[57] ABSTRACT

An energy absorbing mounting bracket is made of a flat rolled steel and includes a frame having a window through which a mast jacket of a steering column protrudes defined by a plurality of flat walls which plastically deform in twist instead of in hinge-like bending. The frame includes a horizontal flat wall above the mast jacket and a pair of generally diagonal flat walls converging toward an apex below the mast jacket where the mast jacket is rigidly connected to the mounting bracket. A mounting flange in the middle of the horizontal flat wall defines a platform whereat the frame is rigidly attached to a body structure of the motor vehicle in cantilever fashion with the frame extending laterally on both sides of the mounting flange so that each of the flat walls of the frame reacts in bending and in twist against a force on the mast jacket in a collapse direction. A reinforcing flange around the periphery of the frame reinforces each of the flat walls against hinge-like bending so that each of the flat walls permanently deforms in twist and not in hinge-like bending to absorb energy.

3 Claims, 3 Drawing Sheets

ENERGY ABSORBING MOUNTING BRACKET

FIELD OF THE INVENTION

This invention relates to an energy absorbing mounting bracket for a motor vehicle steering column.

BACKGROUND OF THE INVENTION

U.S. Pat. No. 4,703,669 describes an energy absorbing mounting bracket for a motor vehicle steering column having a stationary flat mount portion, an integral retainer potion connected to the mount portion at a first bent portion and including a retainer hole through which a mast jacket of the steering column is inserted, and an integral support portion connected to the retainer portion at a second bent portion and to which the mast jacket is welded. During linear collapse of the mast jacket, energy is absorbed through plastic deformation of the bracket at the first and second bent portions where the retainer portion and the support portion bend through opposite arcs in hinge-like fashion, i.e. like two sides of a common door hinge pivoting relative to each other about an axis defined by a hinge pin. An energy absorbing mounting bracket according to this invention is an alternative to the bracket described in the aforesaid U.S. Pat. No. 4,703,669.

SUMMARY OF THE INVENTION

This invention is a new and improved energy absorbing mounting bracket for a motor vehicle steering column made of a plastically deformable material and including a frame having a window through which a mast jacket of the steering column protrudes defined by a plurality of flat walls which plastically deform in twist instead of in hinge-like bending. In a preferred embodiment, the frame is made from flat rolled steel and includes a horizontal flat wall above the mast jacket and a pair of generally diagonal flat walls converging from opposite ends of the horizontal flat wall toward an apex below the mast jacket. Each of the diagonal flat walls merges with a support flange at the apex toward which the diagonal flat walls converge. The mast jacket is rigidly connected to the mounting bracket at the support flange. A mounting flange in the middle of the horizontal flat wall defines a platform whereat the frame is rigidly attached to a body structure of the motor vehicle in cantilever fashion and with the frame extending laterally on both sides of the mounting flange so that each of the flat walls of the frame reacts in bending and in twist against a force on the mast jacket in a collapse direction. A reinforcing flange integral with each of the flat walls extends around the periphery of the frame and reinforces each of the flat walls against hinge-like bending so that each of the flat walls permanently deforms in twist and not in hinge-like bending to absorb energy when the stresses thereon attributable to the twist reactions exceed the yield strength of the plastically deformable material from which the frame is made.

DESCRIPTION OF A PREFERRED EMBODIMENT

Figure 1A:
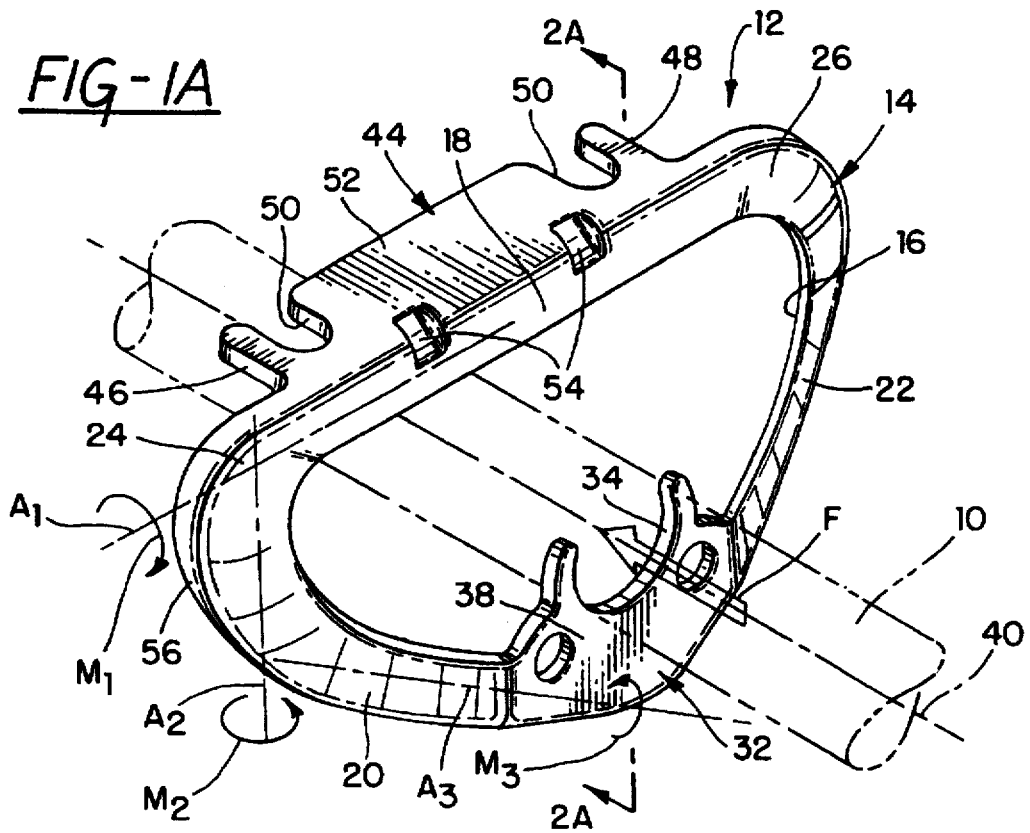
FIGS. 1A–1B are perspective views of an energy absorbing bracket according to this invention before and after, respectively, an energy absorbing stroke thereof.
Figure 1B:
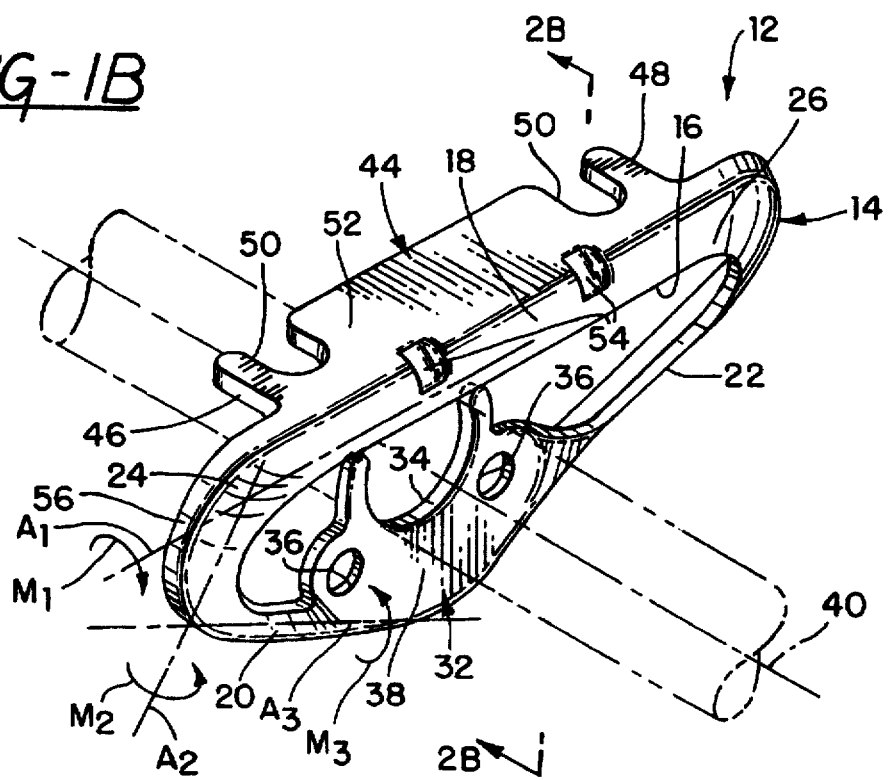
Figure 2A:
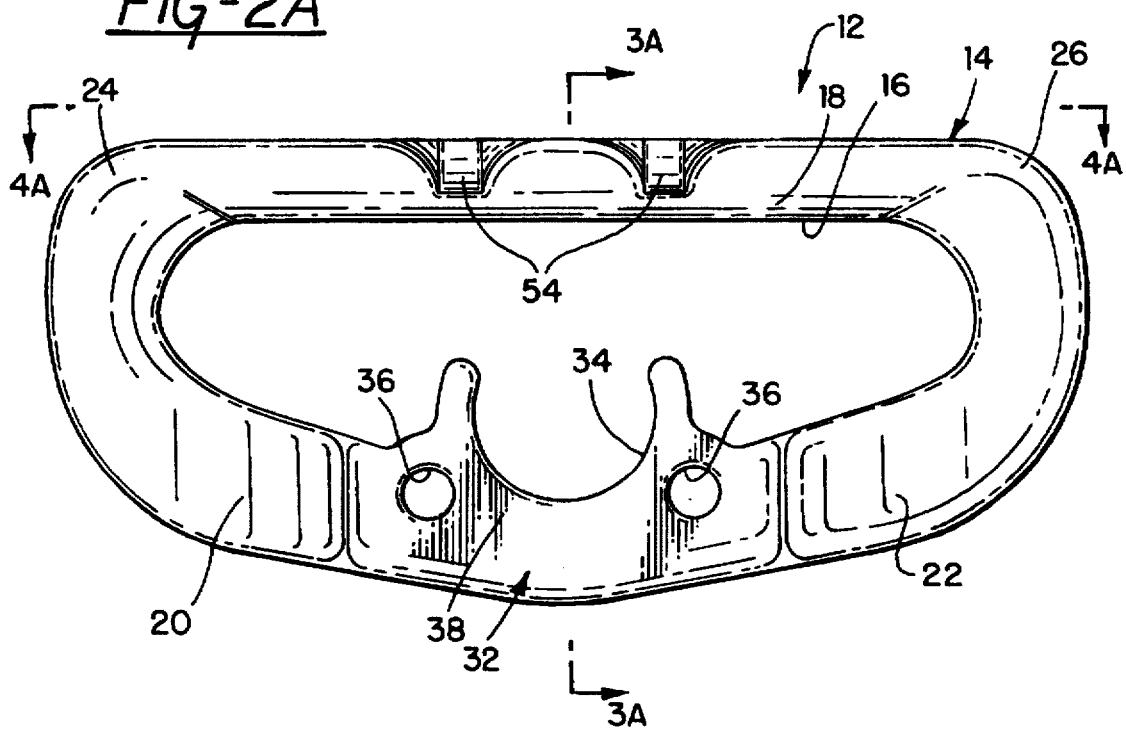
FIGS. 2A–2B are views taken generally along the planes indicated by lines 2A—2A, 2B—2B in FIGS. 1A, 1B, respectively.
Figure 2B:
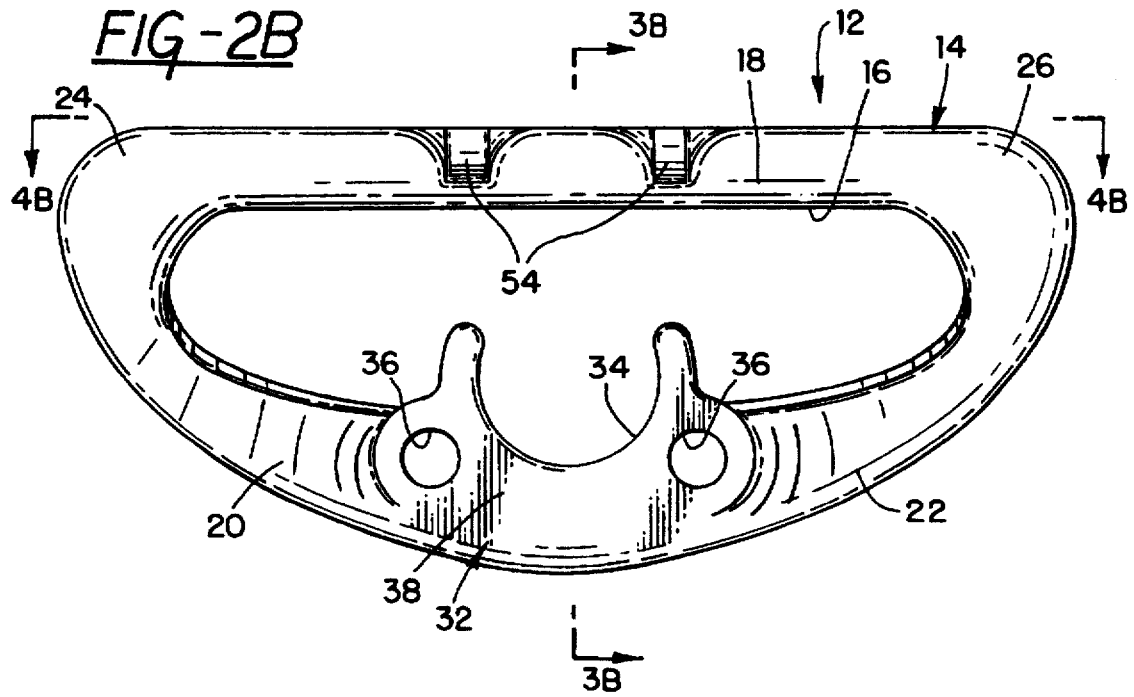
Figure 3A:
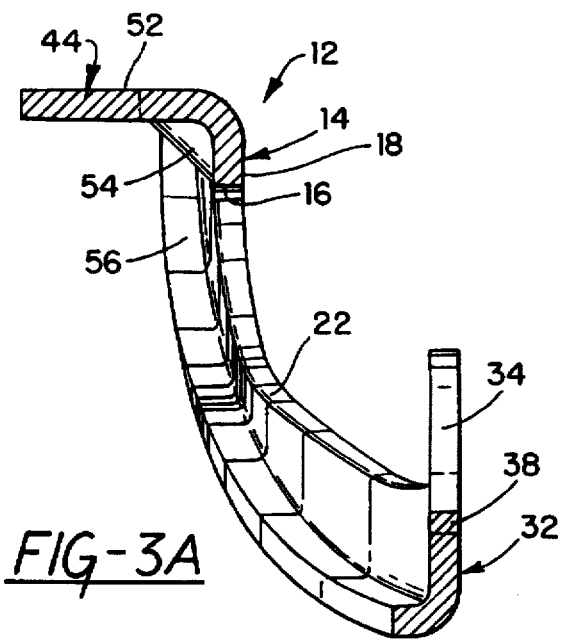
FIGS. 3A–3B are sectional views taken generally along the planes indicated by lines 3A—3A, 3B—3B in FIGS. 2A, 2B, respectively.
Figure 3B:
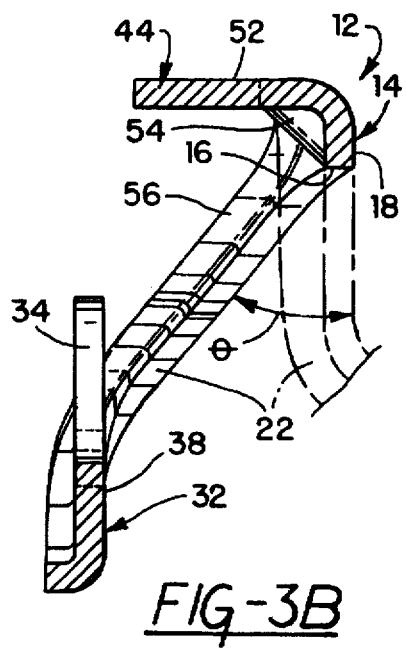
Figure 4A:
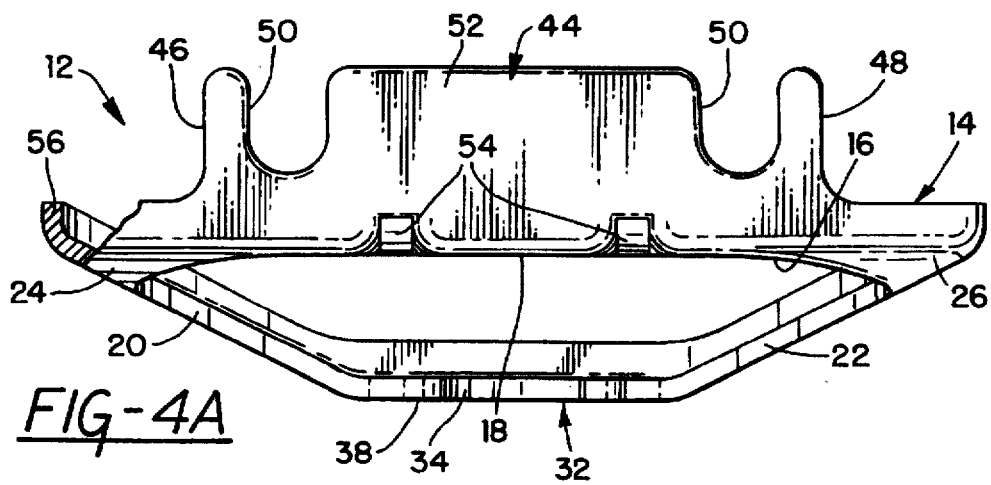
FIGS. 4A–4B are views taken generally along the planes indicated by lines 4A—4A, 4B—4B in FIGS. 2A, 2B, respectively.
Figure 4B:
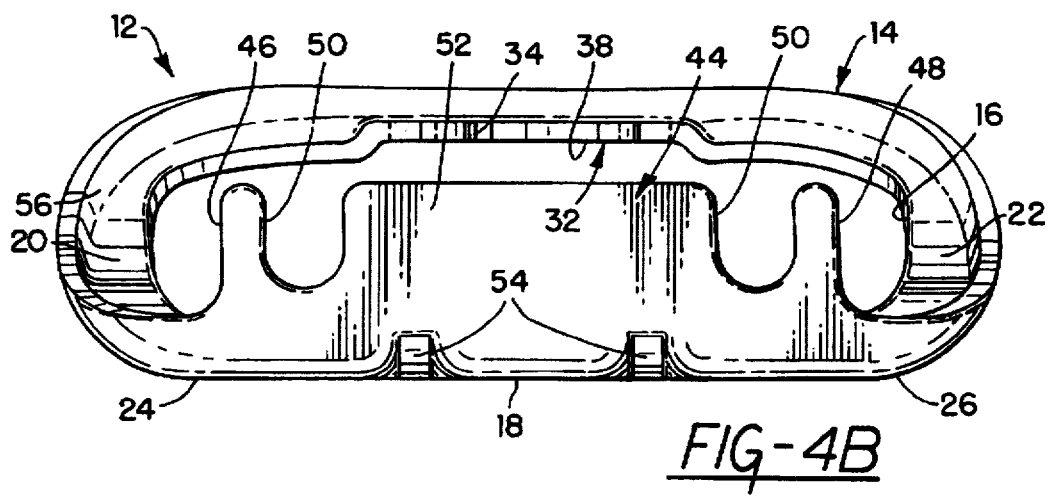

Referring to FIGS. 1A–4A, a schematically represented tubular mast jacket 10 of a motor vehicle steering column is rigidly connected to a body structure, not shown, of the motor vehicle by an energy absorbing mounting bracket 12 according to this invention. The energy absorbing bracket 12 is made of a plastically deformable material, such as thick flat rolled steel, and includes a unitary frame 14 having a window 16 therein defined by a substantially horizontal flat wall 18 above the mast jacket and a pair of diagonal flat walls 20,22 on opposite sides of the mast jacket converging toward an apex below the mast jacket.

The horizontal flat wall 18 has a first end 24 and a second end 26. The diagonal flat wall 20 merges with the horizontal wall 18 at the first end 24 thereof. The diagonal flat wall 22 merges with the horizontal flat wall 18 at the second end 26 of the latter. Near the apex toward which the diagonal flat walls 20,22 converge, the frame 14 has a flat support flange 32 integral with each of the diagonal flat walls 20,22 in a plane generally parallel to the horizontal flat wall 18.

The support flange 32 has a cradle 34 and a pair of bolt holes 36 therein. The mast jacket 10 protrudes through the window 16 of the frame and seats in the cradle 34 with a surface, not shown, of the mast jacket clamped against a side 38 of the support flange by bolts passing through the bolt holes 36 so that the plane of the support flange is perpendicular to a longitudinal centerline 40 of the mast jacket.

Midway between its first and second ends 24,26, the horizontal flat wall 18 has a mounting flange 44 extending generally perpendicular thereto. The mounting flange 44 has a first side edge 46 inboard of the first end 24 of the horizontal flat wall, a second side edge 48 inboard of the second end 26 of the horizontal flat wall, and a pair of open-ended slots 50. Hanger bolts, not shown, are received in the slots 50 and function to clamp an upper surface 52 of the mounting flange against the aforesaid body structure such that the frame 14 is supported on the body structure in cantilever fashion with the frame extending laterally outboard of the mast jacket on both sides thereof. A pair of integral ribs 54 reinforce the horizontal flat wall 18 against hinge-like bending relative to the mounting flange at the integral joint between the two.

Because of the cantilever support of the frame 14 on the motor vehicle body structure and the lateral extension of the frame on opposite sides of the mast jacket, a resultant vector force F effectively directed through the center of the cradle 34 in the support flange in a first or undeflected position of the mounting bracket 12, FIGS. 1A–4A, induces force reactions in the mounting bracket which urge both hinge-like bending and twisting of each of the flat walls. For example, in the first or undeflected position of the bracket 12, FIG. 1A, force reactions attributable to the resultant vector force F yield a plurality of twisting force couples $M_1$, $M_2$, $M_3$ about a corresponding plurality of twist axes $A_1$, $A_2$, $A_3$ on the left side of the bracket and a like plurality, not shown, of twisting force couples on the right side of the bracket. A reinforcing flange 56 integral with and generally perpendicular to each of the flat walls 18,20,22 extends around the periphery of the frame 14 and reinforces each of the flat walls against hinge-like bending.

In operation, as the magnitude of the resultant vector force F increases, bending and torsional stresses in the flat walls 18,20,22 likewise increase. Because the reinforcing flange 56 renders each of the flat walls more resistant to hinge-like bending than to twist, the flat walls 18,20,22 plastically deform in twist, concurrently or in sequence depending upon the relative structural dimensions of the flat walls, when the stresses therein attributable to the twisting force couples $M_1$, $M_2$, $M_3$ exceed the yield strength of the material from which the bracket 12 is made.

As the flat walls 18,20,22 yield in twist, the bracket 12 experiences an energy absorbing stoke from its undeflected position, FIGS. 1A–4A, to a second or deflected position, FIGS. 1B–4B. Such collapse stroke is characterized by pivotal movement of the diagonal flat walls 20,22 through an angle θ, FIG. 3B, and substantially linear translation of the support flange 38 and the mast jacket through a distance corresponding to the energy absorbing stroke of the bracket 12 against the controlled resistance afforded by the plastic deformation of each of the flat walls 18,20,22 in twist about respective ones of the twist axes represented by the axes $A_1$, $A_2$, $A_3$.

I claim:

1. In a motor vehicle, the combination comprising:

a body structure of the motor vehicle, a steering column having a mast jacket, and an energy absorbing mounting bracket for connecting the mast jacket of the motor vehicle steering column to the motor vehicle body structure comprising:

a frame having a window therein through which the mast jacket protrudes defined by a plurality of integrally connected flat walls each made of a plastically deformable material, a support flange rigidly connecting the mast jacket to the frame with a longitudinal centerline of the mast jacket perpendicular to a first flat wall of the plurality of integrally connected flat walls of the frame and with the first flat wall extending laterally on both sides of a longitudinal centerplane of the mast jacket, a mounting flange integral with the first flat wall of the plurality of integrally connected flat walls defining a platform whereat the frame is rigidly connected to the motor vehicle body structure in cantilever fashion and with the first flat wall extending laterally in a first direction beyond a first side edge of the mounting flange and in a second direction beyond a second side edge of the mounting flange so that the first flat wall of the frame reacts in twist against a force on the mast jacket in a collapse direction parallel to the longitudinal centerline of the mast jacket, and a reinforcing flange around the periphery of the frame integral with and reinforcing each of the first flat wall and the remainder of the plurality of flat walls of the frame against hinge-like beam bending so that at least the first flat wall permanently deforms in twist and not in hinge-like beam bending to absorb energy when the stresses thereon attributable to the twist exceed the yield strength of the plastically deformable material from which the frame is made.

2. The combination recited in claim 1 wherein the plurality of flat walls defining the window in the frame further comprises:

a second flat wall extending from a first end of the first flat wall toward an apex of a triangle on an opposite side of the mast jacket from the first flat wall, a third flat wall extending from a second end of the first flat wall toward the apex of the triangle on the opposite side of the mast jacket from the first flat wall, and means connecting the second and the third flat walls generally at the apex of the triangle.

3. The energy absorbing mounting bracket recited in claim 2 wherein:

the plastically deformable material from which each of the flat walls and each of the reinforcing flanges integral therewith is made is steel.

* * * * *